United States Patent
Lull et al.

(10) Patent No.: US 7,748,268 B2
(45) Date of Patent: Jul. 6, 2010

(54) THERMAL FLOW METER

(75) Inventors: John Michael Lull, Fullerton, CA (US); Gawtam Jhoty, Newport Beach, CA (US)

(73) Assignee: Brooks Instrument, LLC, Hatfield, PA (US)

( * ) Notice: Subject to any disclaimer, the term of this patent is extended or adjusted under 35 U.S.C. 154(b) by 129 days.

(21) Appl. No.: 12/193,584

(22) Filed: Aug. 18, 2008

(65) Prior Publication Data

US 2010/0005876 A1 Jan. 14, 2010

Related U.S. Application Data

(60) Provisional application No. 61/080,270, filed on Jul. 13, 2008.

(51) Int. Cl.
G01F 1/68 (2006.01)
(52) U.S. Cl. .................................. 73/204.22
(58) Field of Classification Search ............. 73/204.22, 73/204.21; 29/890.09; 374/138
See application file for complete search history.

(56) References Cited

U.S. PATENT DOCUMENTS

| | | | |
|---|---|---|---|
| 4,440,021 A | 4/1984 | Abouchar et al. | |
| 4,571,801 A * | 2/1986 | Ewing | 29/890.09 |
| 5,191,793 A | 3/1993 | Drexel et al. | |
| 5,279,154 A | 1/1994 | Vavra et al. | |
| 5,660,207 A | 8/1997 | Mudd | |
| 6,044,701 A | 4/2000 | Doyle et al. | |
| 6,361,206 B1 * | 3/2002 | Bonne | 374/138 |
| 6,729,181 B2 * | 5/2004 | Mayer et al. | 73/204.22 |
| 6,779,394 B2 | 8/2004 | Ambrosina et al. | |
| 6,779,395 B2 * | 8/2004 | Hornung et al. | 73/204.21 |
| 6,845,659 B2 | 1/2005 | Lull | |
| 6,962,164 B2 | 11/2005 | Lull et al. | |
| 6,971,274 B2 * | 12/2005 | Olin | 73/866.5 |

* cited by examiner

*Primary Examiner*—Jewel Thompson
(74) *Attorney, Agent, or Firm*—Sonnenschein Nath & Rosenthal LLP

(57) ABSTRACT

A thermal mass flow controller or mass flow meter having a novel sensor housing that reduces heat conduction from the housing mounting plate or base to the sensor itself. The housing also greatly minimizes the thermal gradient that can result from the uneven application of heat to the housing base. This reduction is accomplished in part by the use of one or more thermal isolation slots to isolate the upper portion of the housing (which holds the sensor) from the lower portion of the housing. Heat transfer to the sensor housing is also minimized by raising the middle portion of the bottom of the housing so that thermal contact is made between the base and the housing only at the two ends of the housing.

38 Claims, 10 Drawing Sheets

THERMAL FLOW METER

This application claims priority from U.S. Provisional Application No. 61/080,270 filed on Jul. 13, 2008, which is hereby incorporated by reference.

TECHNICAL FIELD OF THE INVENTION

Aspects of the present invention are directed to the measurement and control of the rate of flow of a fluid, and more particularly to a thermal flow meter that reduces heat conduction to the thermal flow sensor and that minimizes the effects of a thermal gradient on the sensor.

BACKGROUND OF THE INVENTION

The manufacture of semiconductors typically requires precise control of fluids (e.g., gasses, liquids, gas-vapor mixes) throughout the manufacturing process. Measurement and regulation of fluid flow is typically achieved by the use of a thermal mass flow controller (MFC). The MFC has a flow meter or sensor, which generally operates by directing fluid flow through a capillary tube path that runs parallel to a bypass area of the main flow path. Two thermally sensitive resistors are wound around the capillary tube. As fluid travels through the capillary tube, heat is imparted to the fluid and conducted away from the resistors, causing the resistance of each of the resistors to change and the temperature of the fluid to change. Based on the difference in resistance between the two resistors, a controller executing a control algorithm can determine the flow through the MFC. The flow sensor is coupled to a control valve and feedback circuit so that the flow rate can be electronically set or manipulated. Solenoid activated valves are often used as control valves because of their simplicity, quick response, robustness and low cost.

As illustrated in FIGS. 1A and 1B, thermal mass flow controller 100 includes a block 110, which is the platform on which the MFC's components are mounted. The block has a fluid inlet 120 and a fluid outlet 130 connected by the channels 122 that form the main flow path of the fluid. Thermal mass flow meter 140 and valve assembly 150 are mounted on the block. As shown in FIG. 1B, all of these components along with the associated control electronics 160 (typically formed on a printed circuit board) are contained within an outer cover 162, commonly referred to as a "can."

In the illustrated example, the thermal mass flow meter 140 includes a pressure dropping bypass 142 through which a majority of fluid flows, and a thermal flow sensor 146 through which a smaller portion of the fluid flows. The thermal flow sensor 146 is contained within a sensor housing 102 mounted on a mounting plate or base 108. Sensor 146 is a small diameter tube, referred to as a capillary tube, with a sensor inlet portion 146A, a sensor outlet portion 146B, and a sensor measuring portion 146C about which two resistive coils or windings 147, 148 are disposed.

In operation, electrical current is provided to the two resistive windings 147, 148, which are in thermal contact with the sensor measuring portion 146C. The heat generated by the resistive windings 147, 148 is used to heat the fluid flowing therein to a temperature that is above the temperature of the fluid flowing through the bypass 142. As known to those skilled in the art, the rate of flow of fluid in the flow sensor 146, which is proportional to the rate of flow of fluid through the mass flow controller 100, may be determined in a number of different ways, such as, by a difference in the resistance of the resistive windings, by a difference in the amount of energy provided to each resistive winding to maintain each winding at a particular temperature or at a particular temperature above ambient temperature, etc. Examples of the ways in which the flow rate of a fluid in a thermal mass flow meter may be determined are described, for example, in commonly owned U.S. Pat. No. 6,845,659 B2, which is hereby incorporated by reference.

A fundamental problem with typical MFCs is that, due to the operating principal of the flow sensor, external temperature differentials can greatly impact the accuracy of the flow measurement. For example, the solenoid valve and electronics generate heat during operation. Since the components of the MFC are all thermally connected, the heat generated by the valve 150 and electronics can cause a temperature gradient across the MFC, which in turn causes a temperature gradient across the thermal mass flow meter 140, which in turn causes a temperature gradient along the flow sensor 146. Because the flow sensor actually operates by responding to a heat/resistance difference between the two coils, a temperature gradient across the flow sensor will be interpreted as fluid flow and will result in variations and errors in flow measurements.

The effects of externally created thermal gradients (for example, those caused by the normal operations of other MFC components) on the sensor readings can be fairly large. For example, the sensor output on a prior art MFC can vary by almost 1% of full scale when the valve is changed from "off" to "purge." The effect of a temperature change can also take two hours to dissipate because of the large thermal masses involved.

One way of compensating for the temperature gradient effect is to build an algorithm into MFC firmware that continually calculates the amount of power going into the valve and uses that value to estimate and compensate for the temperature gradient. This approach can be used to reduce output variation down to about 0.1% of full scale. However, for modern semiconductor manufacturing methods it is desirable to reduce output variation by another order of magnitude.

One prior art method of mechanically reducing the sensor temperature gradient is seen in U.S. Pat. No. 6,779,394 to Ambrosina et al. for "Apparatus and Method for Thermal Management of a Mass Flow Controller." Ambrosina teaches a sensor housing which makes contact with the base plate at only one central point. By having only one centrally located thermal pathway, the heat conduction is somewhat equalized for both sides of the housing and the effects of the thermal gradient are minimized.

However, the solitary central connection point in Ambrosina tends to allow the sensor housing to flex (for example, by rocking in one direction or another). This flex can cause undesirable stress on the capillary tube. Also, in other common types of MFCs, components such as pressure transducers (to measure the pressure upstream from the bypass) are commonly located under the sensor base. As the base is tightened down onto the block, this tends to cause the base to flex. If the sensor housing is only attached to the base at one center point, flexure of the base can cause an unacceptable stress on the two ends of the capillary tube. Further, the Ambrosina design may reduce the actual gradient on the housing (and thus the sensor) but it does not sufficiently reduce the total heat conduction from the base. Even in the absence of a gradient, it is desirable to minimize the total amount of heat conducted to the sensor.

What is needed is an improved mass flow meter designed to minimize the effects of a thermal gradient along the sensor base and to minimize heat conduction from the sensor base to the sensor elements.

SUMMARY OF THE INVENTION

An object of the invention, therefore, is to provide an improved MFC with a novel sensor housing that reduces heat conduction from the housing base to the sensor itself. Another object of the invention is to minimize the thermal gradient that can result from the uneven application of heat to the housing base. A thermal mass flow controller or mass flow meter according to the present invention provides a novel sensor housing that reduces heat conduction from the housing mounting plate or base to the sensor itself. The housing also greatly minimizes the thermal gradient that can result from the uneven application of heat to the housing base. This reduction is accomplished in part by the use of one or more thermal isolation slots to isolate the upper portion of the housing (which holds the sensor) from the lower portion of the housing. In some embodiments, heat transfer to the sensor housing is also minimized by raising the middle portion of the bottom of the housing so that thermal contact is made between the base and the housing only at the two ends of the housing.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

A thermal mass flow controller or mass flow meter according to the present invention provides a novel sensor housing that reduces heat conduction from the housing mounting plate or base to the sensor itself. The housing also greatly minimizes the thermal gradient that can result from the uneven application of heat to the housing base. This reduction is accomplished in part by the use of one or more thermal isolation slots to isolate the upper portion of the housing (which holds the sensor) from the lower portion of the housing. Heat transfer to the sensor housing is also minimized by raising the middle portion of the bottom of the housing so that thermal contact is made between the base and the housing only at the two ends of the housing.

Various embodiments and aspects thereof will now be described in more detail with reference to the accompanying FIGS. A preferred method or apparatus of the present invention has many novel aspects. Because the invention can be embodied in different methods or apparatuses for different purposes, not every aspect need be present in every embodiment. Moreover, many of the aspects of the described embodiments may be separately patentable. The FIGS. described below are generally schematic and do not necessarily portray the embodiments of the invention in proper proportion or scale. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items. In the description below, terms such as "vertical," horizontal," "upper," "lower," "right," "left" and/or "front to back" may be used. Unless otherwise stated, such terms will be intended to describe the apparatus with respect to the orientation as shown in the accompanying FIGS. and may not be applicable if the apparatus is mounted or used in a different orientation or configuration. Although much of the following description is directed at thermal mass flow meters and controllers, the present invention could also be used with any thermal flow meter that provides a signal indicative of flow whether it provides a volumetric flow measurement or a mass flow measurement.

Figure 2:
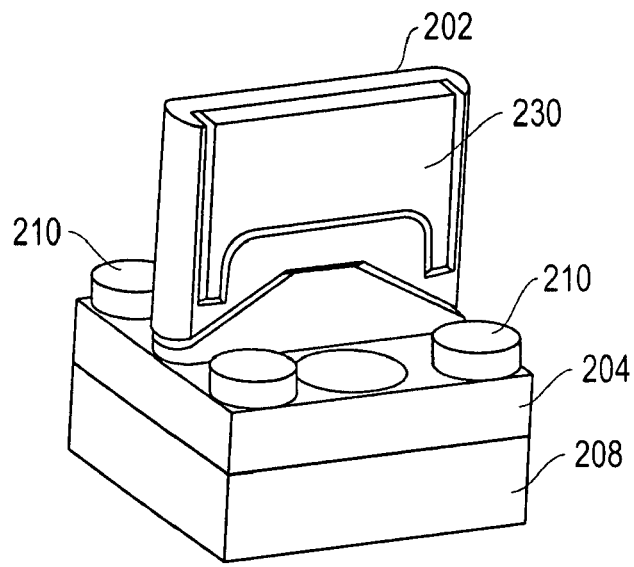
FIG. 2 shows a sensor unit according to a preferred embodiment of the present invention.
Figure 3:
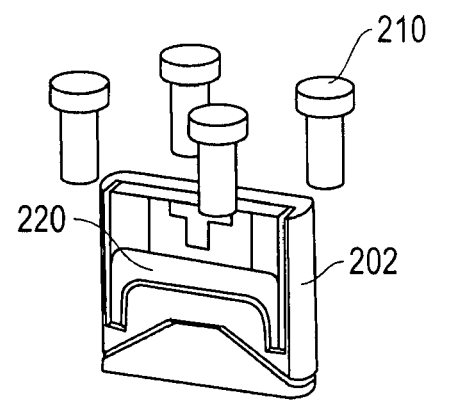
FIG. 3 shows an exploded view of the sensor unit of FIG. 2.
Figure 3:
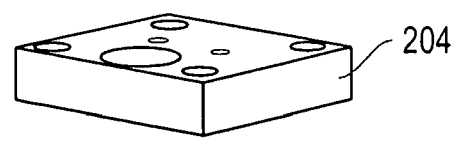
Figure 3:
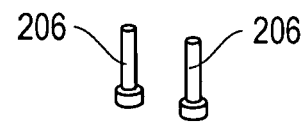
Figure 3:
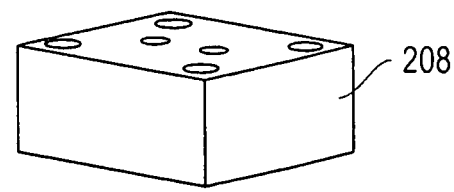

FIGS. 2-4 show a sensor housing 202 according to a preferred embodiment of the present invention. Housing 202 is preferably formed from a metal casting, such as copper, aluminum, or zinc-aluminum die casting alloys, and is mounted onto a metallic base 204 such as, for example, a stainless steel base. The housing may be manufactured by any suitable manufacturing process, such as machining from a solid piece of metal, casting, etc. Nano-fiber materials having enhanced thermal conductivity could also provide additional benefits as a housing material. Persons of skill in the art will recognize that in any material choice there will be tradeoffs between performance and cost that will determine the material chosen.

Two connectors 206, such as screws, at either lateral end of the housing are used to attach the housing to the base so that the bottom surface of the housing is held in place against the upper surface of the base. In a preferred embodiment, the middle portion of the bottom surface of the housing is raised as shown in FIG. 4 so that when attached, the housing and the base are only in thermal contact at the two lateral ends of the housing. In other words, when the housing is attached to the upper surface of the base, the center region of the housing 418 is raised above and does not make contact with the upper surface of the base. Preferably, the raised area on the bottom of the housing extends out nearly to the points where the two ends of the capillary tube pass through the housing. The raised center region and the two lateral contact areas serve to improve the mechanical stability of the connection of the housing to the base and also to improve thermal performance by eliminating a large portion of the potential thermal pathway between the base and the housing.

Figure 4A:
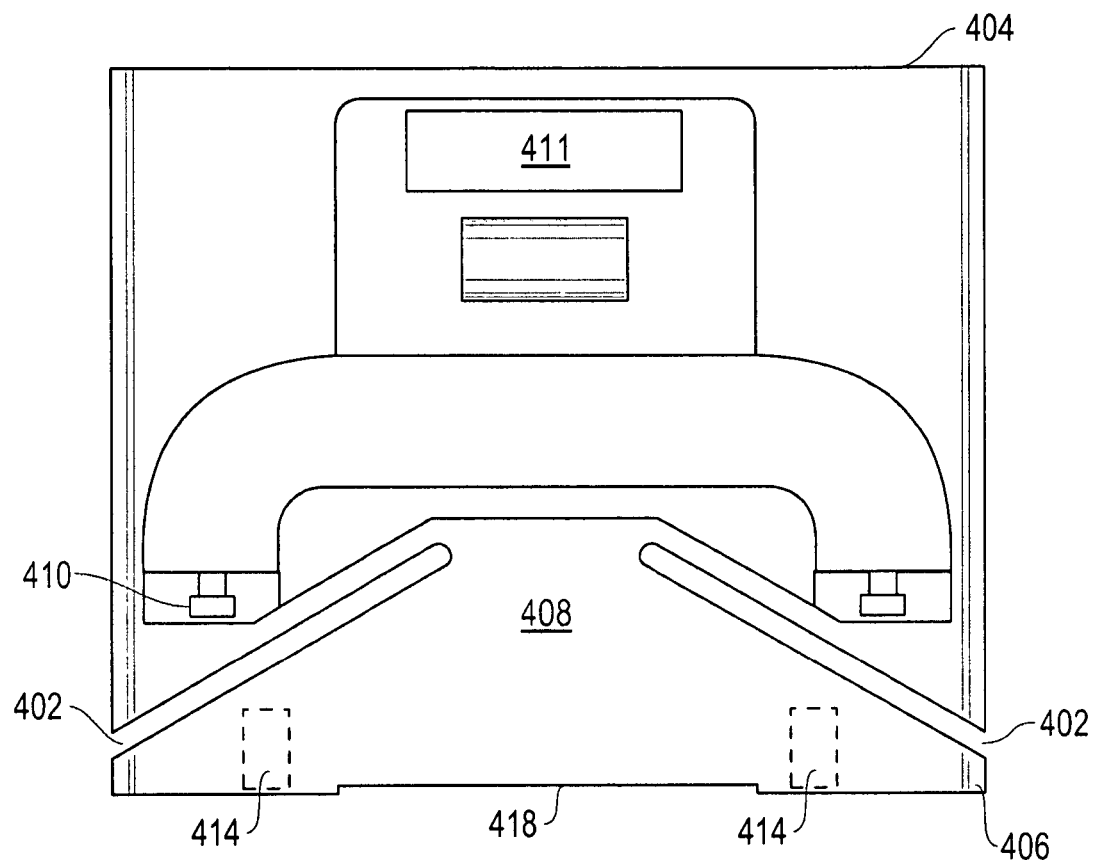
FIG. 4A shows a sensor housing according to a preferred embodiment of the present invention.
Figure 4B:
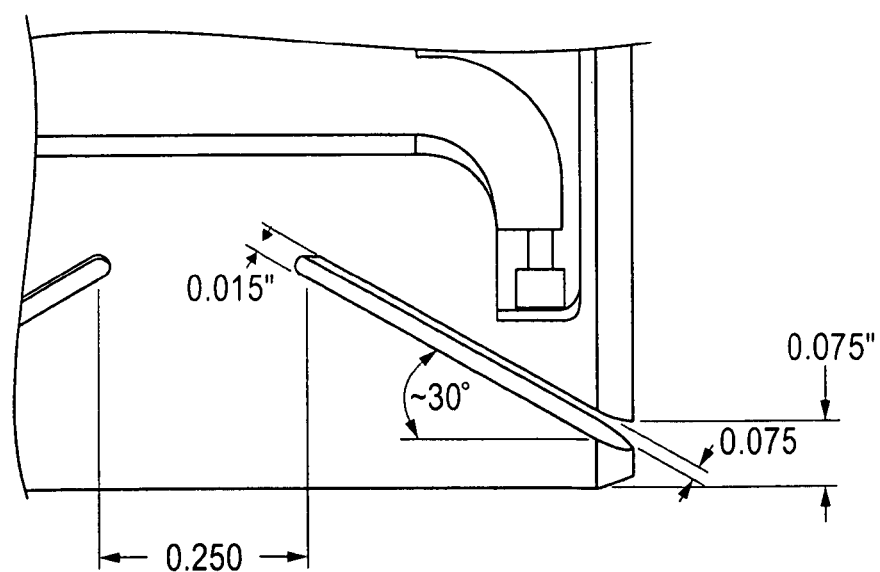
FIG. 4B shows a close up of the sensor housing of FIG. 4A showing approximate dimensions according to a preferred embodiment of the present invention.

As shown in FIGS. 4A and 4B and discussed in greater detail below, thermal isolation slots 402 are formed in the housing to separate the housing into an upper portion 404 and lower portion 406. The slots are preferably formed completely through the housing from front to back as shown in FIGS. 4A and 4B. In some embodiments, however, the slots could also be formed by removing less than all of the material, but leaving a thinner region of material that is thin enough that thermal conductivity across the membrane is substantially limited. For increased mechanical strength, the slots could also be filled with a non-thermally conductive material and/or portions of metal could be left in the slots. In some preferred embodiments, the slots may have a slight taper to facilitate removal from the mold when the housing is manufactured.

The upper and lower portions are thus only thermally connected to a significant degree through the central or medial housing portion 408. (Skilled persons will recognize that there will be some degree of thermal conductivity even across the gaps, but it will be substantially less than the thermal conduction across the central portion.) In a preferred embodiment, central portion 408 is relatively thick from front to back (preferably the full thickness of the casting) to provide substantial thermal conductivity across the center region.

Electrical connections to the sensor are preferably made through the upper portion 404 of the sensor housing in order to maintain as much material below the capillary tubes as possible. Opening 411 provides space for a header to bring the electrical connections into the housing.

Figure 7:
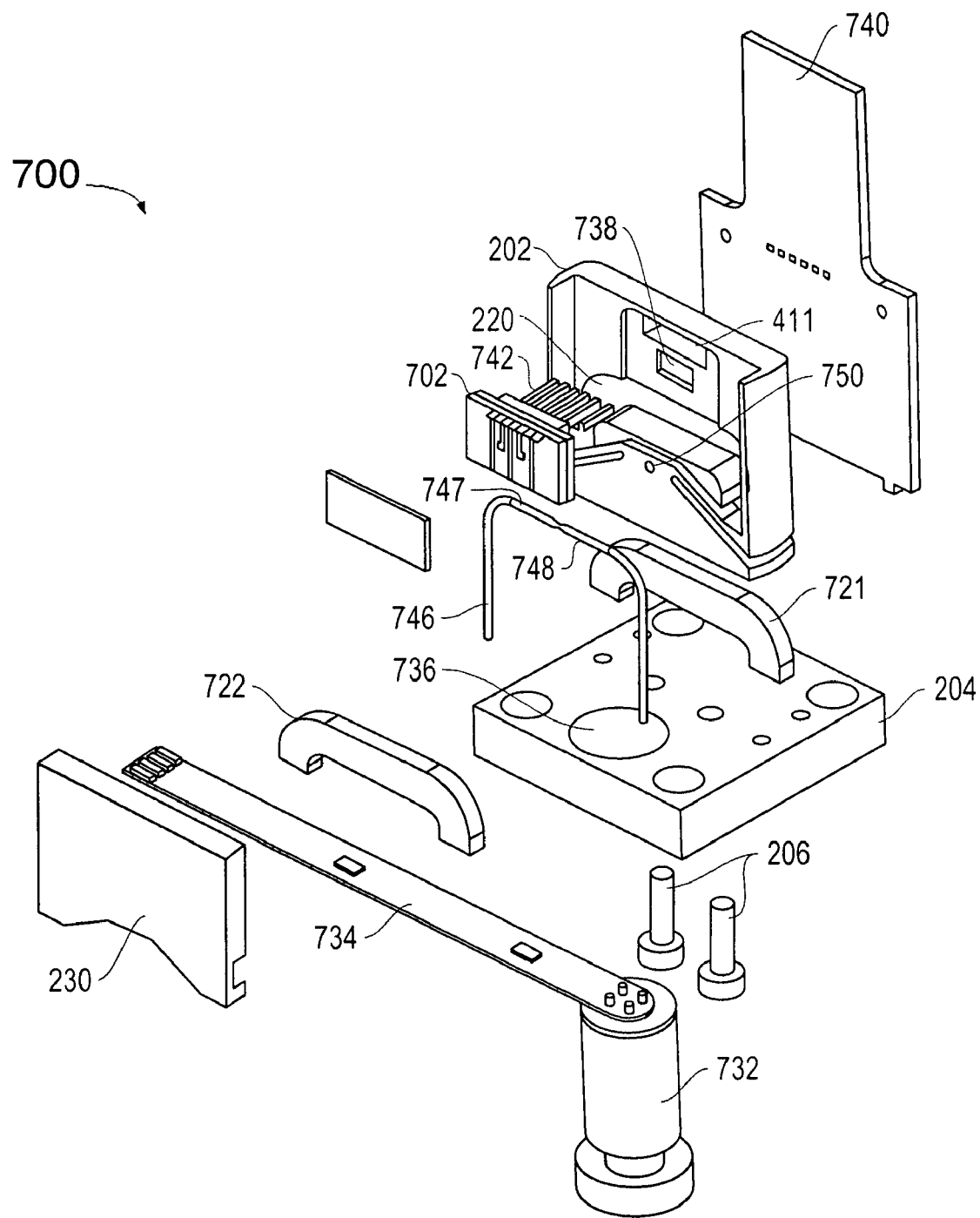
FIG. 7 shows an exploded view of a complete sensor assembly according to the present invention.

Referring also to FIG. 7, the capillary tube 746 fits into curved slot 220. The capillary tube is held in place by an epoxy, which forms thermal clamps 410, 412 at an appropriate distance from the sensor coils. The epoxy may include additives such as powdered copper to enhance the thermal conductivity of the adhesive. In a preferred embodiment, the coils are sized to be optimal for the size of the capillary tubes. The capillary tubes are 14 mil bore tubes with walls that are 2 mils thick and formed from a corrosion-resistant material such as HASTELLOY; although other standard sizes and materials could be used depending on the fluids and flow rates being measured. (As used herein, one "mil" equals 0.001 inches.) The capillary tube 746 inside the curved slot 220 is insulated by front 722 and back 721 foam insulation pads.

The sensor housing 202 is preferably attached to very thick base 204 as shown in FIG. 2. The housing is preferably bolted from the bottom using screws 206 at two points, 414, and 416, one on either lateral side of the housing. By using two contact points, the housing is held in place more securely and the joint between the housing and the base will not flex and possibly damage the capillary tubes. The contact regions 414, 416 between the sensor housing and the base are also adhered together with epoxy. Thermal contact between the housing and the base is made not only through the two screws, but also through the epoxy.

The base itself is attached to the block, which contains the fluid flow channels. For simplicity, FIGS. 2-3 show the housing attached to a simplified block 208. The housing in FIG. 2 also has cover 230 in place. The sensor housing base 204 is preferably formed from a material like stainless steel that has a relatively low thermal conductivity, is mechanically very rugged, and is relatively inexpensive. The thickness of the stainless steel also tends to hold a great deal of the heat that would otherwise be transferred to the housing and ultimately to the sensor.

Thermal isolation slots 402 are preferably slanted upward at an angle of between 10 degrees and 60 degrees from the horizontal upward from the edges of the housing toward the center region. More preferably, the slots are slanted upward at an angle of approximately 30° from the horizontal upward from the edges of the housing toward the center region. It should be recognized that the relative term "horizontal" refers mainly to the orientation of the housing as shown in the FIGS. Because the sensor assembly could be mounted in several different configurations, the term horizontal is intended to be equivalent to the plane of the top surface of the sensor housing base.

As shown in FIG. 4A, the slots are formed completely through the entire thickness of the housing from front to back so that the upper portion 404 and lower portion 406 of the housing are only connected in the remaining central portion 408. Preferably the slots each extend more than one-third of the way across the housing, leaving the central portion between the slots having a width of less than one-third of the total lateral width of the housing. Skilled persons will recognize that longer slots will typically result in a greater reduction of the thermal gradient, but will cause the housing to be less mechanically stable. In addition to the slots, one or more additional holes or slots can be formed through the central portion 408 to remove even more thermally conductive material. For example, as shown in FIG. 7, center hole 750 creates two distinct thermal pathways from the lower portion of the housing to the upper portion. As shown in FIG. 4B, in a preferred embodiment, the slot height (the distance across the gap between the upper and lower portions) is approximately 0.015 inches, although other widths can be used such as 0.020 inches or 0.030 inches. The central portion of the housing between the slots preferably has a width (laterally across the face of the housing) of approximately 0.25 inches, although other widths can be used such as 0.20 inches or 0.15 inches. Other dimensions can be used depending upon the acceptable tradeoff between thermal properties, housing mechanical stability, material costs, etc., for a desired application.

Applicants have discovered that it is desirable to have as much thermally conductive material as possible below the slots. As a result, in general the higher the slots (from the bottom of the housing) the lower the thermal gradient at the thermal clamps. But by angling the slots as shown in FIG. 4A, there is substantially less material (and accordingly greater thermal resistance) in contact regions 414 and 416 than in the middle region 418. If thermal resistance as a result of position along the housing base is examined, it preferably is high at either contact region but much lower in the central portion of the housing base.

Figure 5:
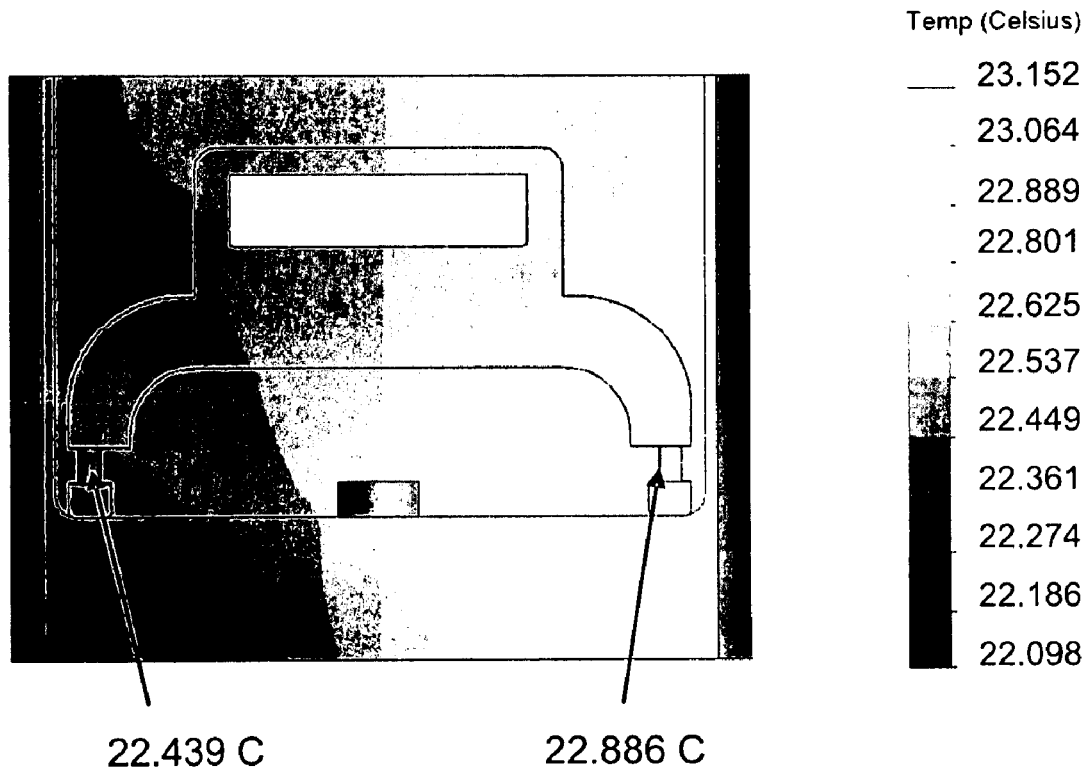
FIG. 5 shows a thermal gradient map of a sensor housing without thermal isolation slots or a raised portion at the bottom of the housing.
Figure 6:
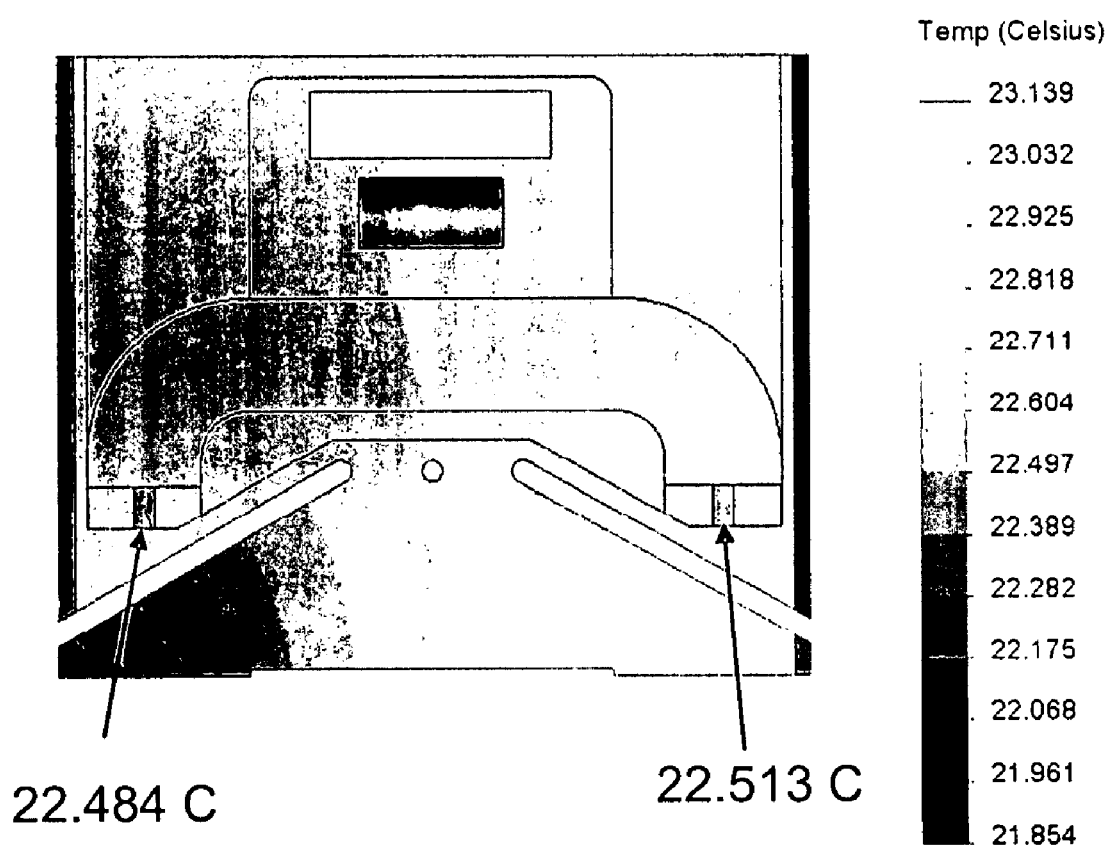
FIG. 6 shows a thermal gradient map of the sensor housing of FIG. 4.

This is confirmed by the thermal gradient maps shown in FIGS. 5 and 6. FIG. 5 shows a sensor housing of the same general configuration as the housing of FIG. 2, but without the raised area on the bottom of the housing and without the thermal isolation slots. Heating the block to create a 5° C. temperature gradient (from 20° C. to 25° C.) across the block (so that the higher temperatures are on the right side of the housings shown in the figures) results in a temperature of 22.886° at right thermal clamp 412 and 22.439° at left thermal clamp 410—a difference of 8.96% across the two clamps. (Because the two thermal clamps are on either side of the sensor itself, the temperature gradient between the two thermal clamps can be assumed to be the temperature gradient across the sensor.) FIG. 6 shows sensor housing according to the present invention having the raised area on the bottom of the housing and the angled thermal isolation slots. Heating the block as above to create a 5° C. temperature gradient results in a temperature of 22.513° at right thermal clamp 412 and 22.484° at left thermal clamp 410—a difference of only 0.58% across the two clamps. So in the embodiment shown in FIG. 6, a 5° C. temperature gradient on the block results in only a 0.029° gradient across the two thermal clamps.

FIG. 7 shows an exploded view of a sensor assembly 700 according to the present invention. To assemble the unit, a header 702 is positioned through opening 411 and attached to the housing by epoxy. The header provides an attachment point for the electrical connections to the sensor. A flexible cable (not shown) with copper connections can be used to connect the contacts on the front of the header to the unit's electronics (typically on a printed circuit board within the can). The rear foam insulation pad 721 for the capillary tube 746 is then placed within the curved slot 220. The capillary tube 746 is then put in place and laser-welded to the base. Referring also to FIG. 4A, the tube is also held in place by epoxy forming two thermal clamps 410, 412 on either side just below the curved portion. The connections from resistive windings 147, 148 are welded to the electronics on the unit's printed circuit board (not shown). The front foam insulation pad 722 is placed over the capillary tube 746. The cover 230 is then snapped on (and attached with epoxy at various points).

Figure 1A:
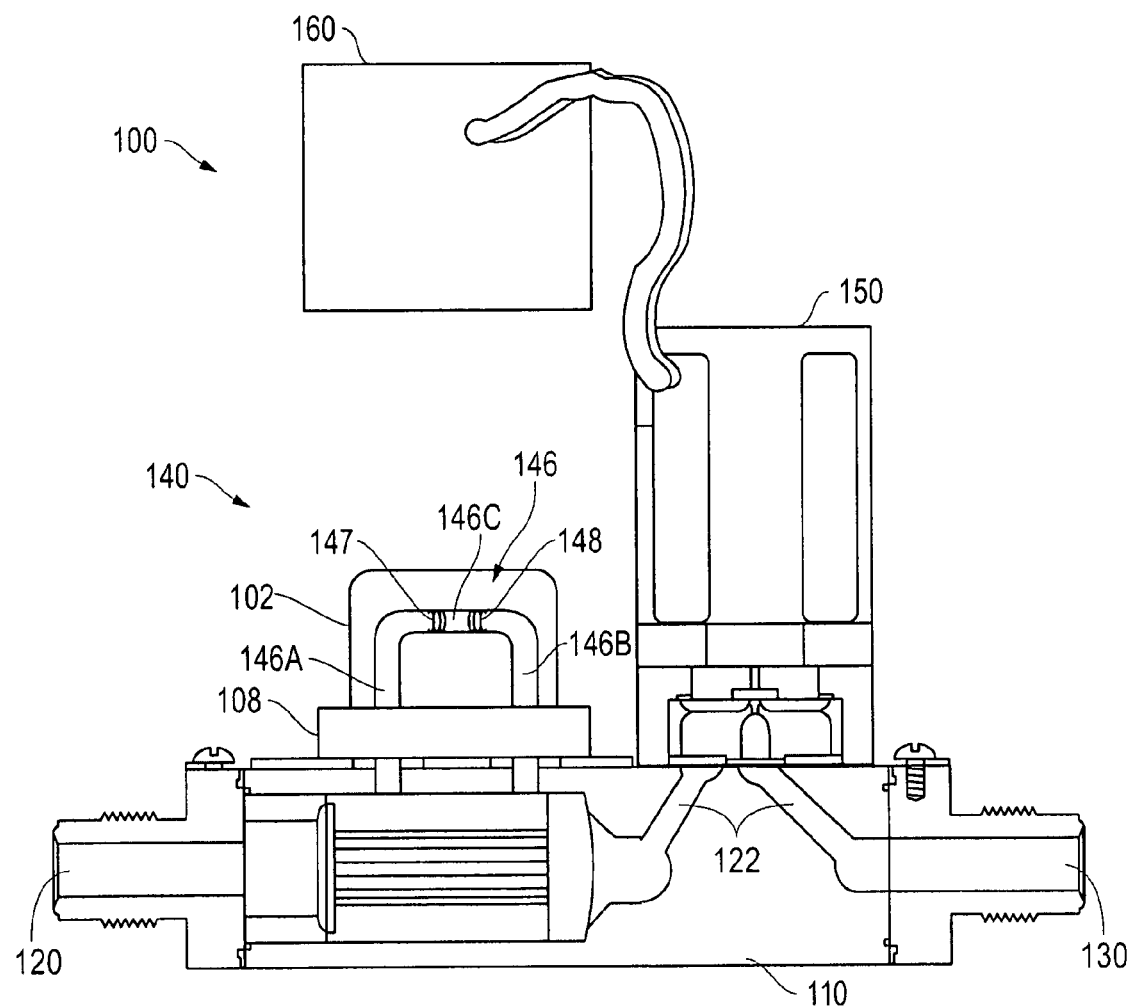
FIG. 1A illustrates a conventional prior art thermal mass flow controller.
Figure 1B:
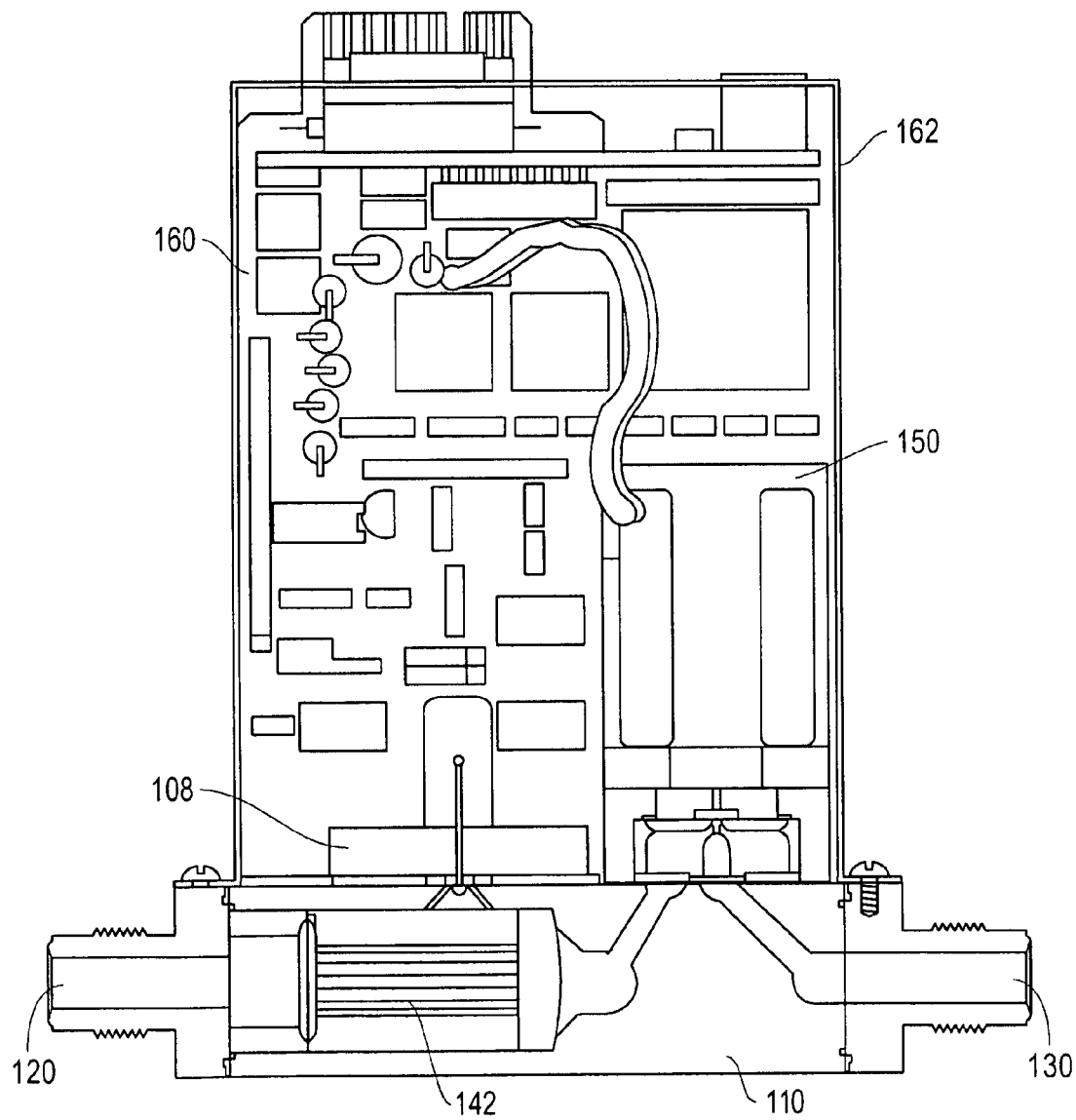
FIG. 1B is a cutaway view of a conventional prior art MFC unit.

Also shown in FIG. 7 is a pressure transducer 732 (and associated electrical connector cable 734) which fits through transducer opening 736 in the base. Referring also to FIGS. 1A and 1B, pocket 738 in the housing can hold a thermister to measure the temperature of the flow controller block 110 and sensor base 108—which will typically be nearly identical to the temperature of the gas inside the bypass element 142. The air surrounding the flow controller might be of a similar temperature or the flow controller might be actively heated to a temperature greater than the surrounding air for purposes of keeping the controlled fluid in a vaporized condition. In conjunction with the thermister, a driver is preferably used to keep the resistive windings at about 80° C. above the ambient temperature.

Figure 8:
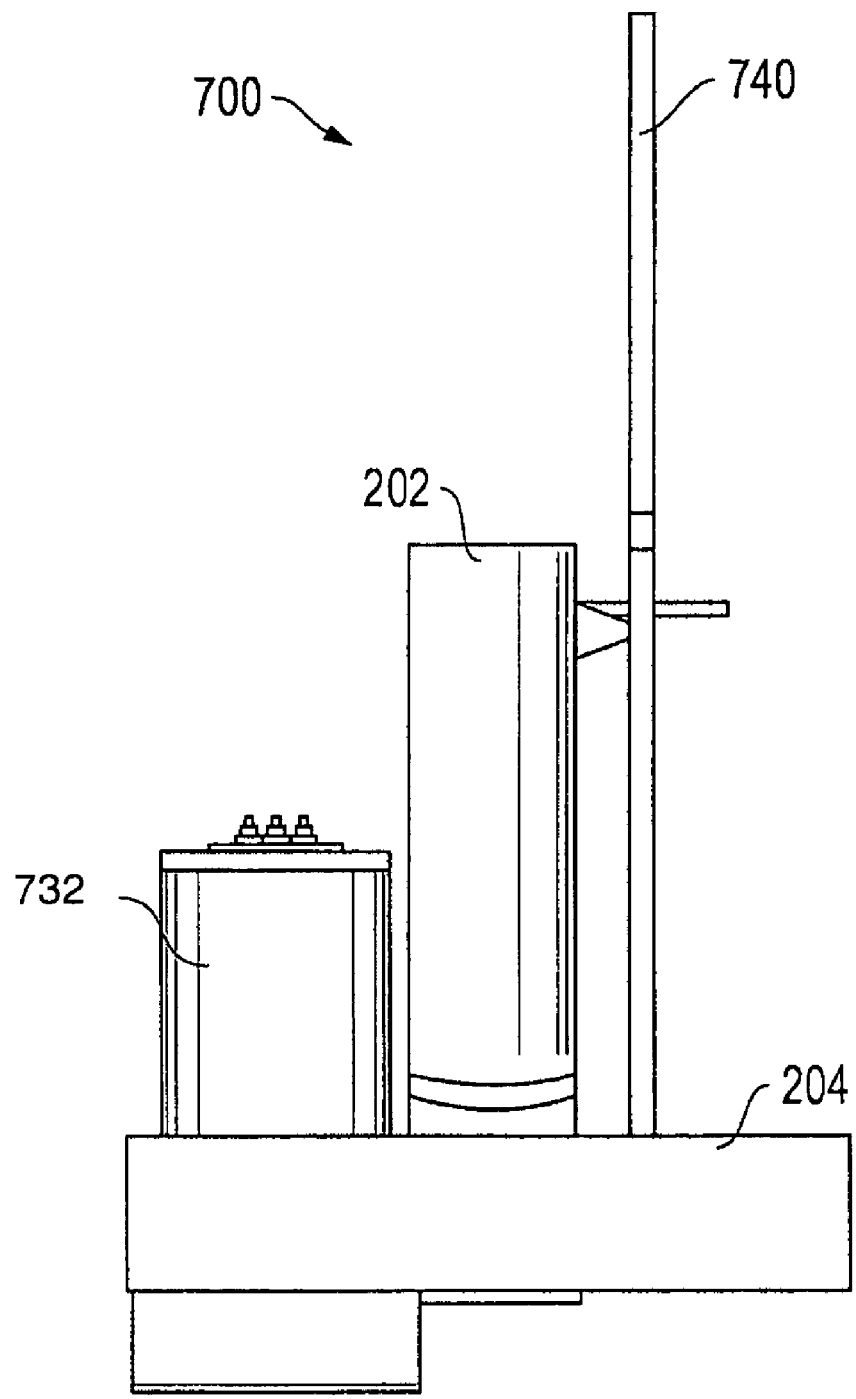
FIG. 8 shows a side view of the assembled sensor assembly of FIG. 7.

In the embodiment shown in FIGS. 7 and 8, sensor driver board 740 is mounted directly on the sensor element. The electrical connection for the sensor driver board passes through opening 411 in the housing. The sensor driver board includes non-volatile memory that stores all of the calibration and tuning coefficients for the sensor. In traditional prior-art MFC designs, information regarding performance characteristics peculiar to each specific sensor would be stored in non-volatile memory associated with the control electronics of the MFC into which the sensor was installed. As taught in commonly owned U.S. Pat. No. 6,962,164 to Lull et al. for "System and Method for a Mass Flow Controller," which is hereby incorporated by reference, there may be coefficients, parameters, gain terms, and similar configuration data stored in non-volatile memory to enable normalization, response compensation, and linearization of the sensor signal by the MFC electronics. When a prior design sensor is separated from the control electronics, there is no mechanism to bring the sensor related configuration data into the control electronics. In the present invention, however, the sensor related configuration data may be stored in the non-volatile memory that is mechanically bound to the specific sensor thereby allowing any control electronics to read said configuration data upon connection to the specific sensor assembly. This arrangement enables replacement of the sensor assembly without disrupting the otherwise complete mass flow controller. By physically mating the sensor driver board to the sensor itself, the components can be more easily replaced as a single unit. If the sensor has to be replaced, the entire MFC does not have to be recalibrated. Instead, the new sensor unit can be plugged in and the MFC up and running in much less time because the non-volatile memory can provide calibration and tuning coefficients to the MFC.

Figure 9:
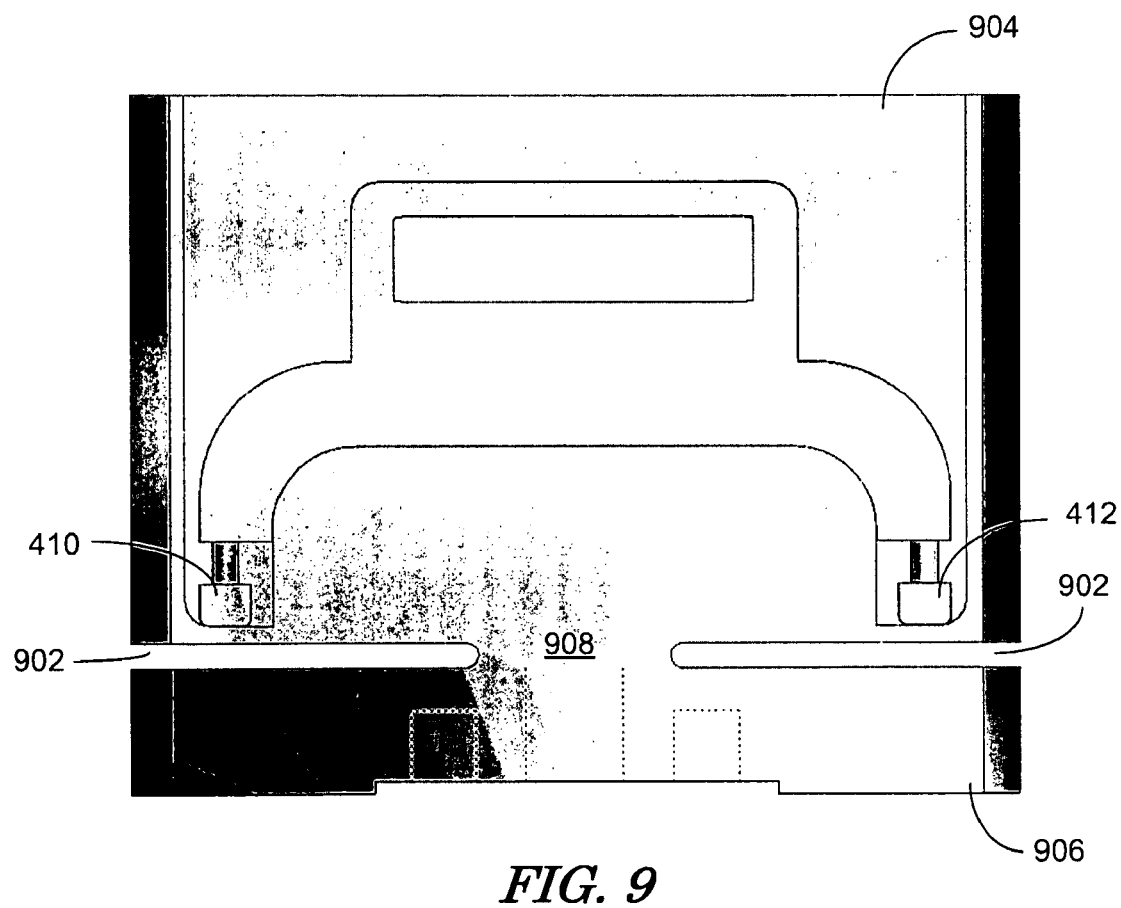
FIG. 9 shows a sensor housing according to another preferred embodiment of the present invention.

FIG. 9 shows another preferred embodiment of a sensor housing 900 of the present invention. In the embodiment of FIG. 9, horizontal thermal isolation slots 902 are used instead of the angled slots discussed above to divide the housing into an upper portion 904 and a lower portion 906, with the upper and lower portions only continuous at central region 908. Applicants have discovered that it is desirable to have as much thermally conductive material as possible below the slots. As a result, and in general, the higher the slots (from the bottom of the housing) the lower the thermal gradient at the thermal clamps. Accordingly, the best thermal performance will be seen with horizontal slots that are as high from the base as possible. Of course, there is a limit to how high the slots can be without interfering with the thermal clamps 410 and 412 that hold the capillary tube in place. In some environments, it might be possible to lengthen the housing (to more easily put more thermally conductive material below the thermal isolation slots) but in general this would not be desirable because there are disadvantages to lengthening the capillary tube and because the sensor would then take up more valuable space (which is typically at a premium in any semiconductor manufacturing). Slots can be at any desired angle from an upward slope to a downward slope, limited only by the physical dimensions of the housing.

Figure 10:
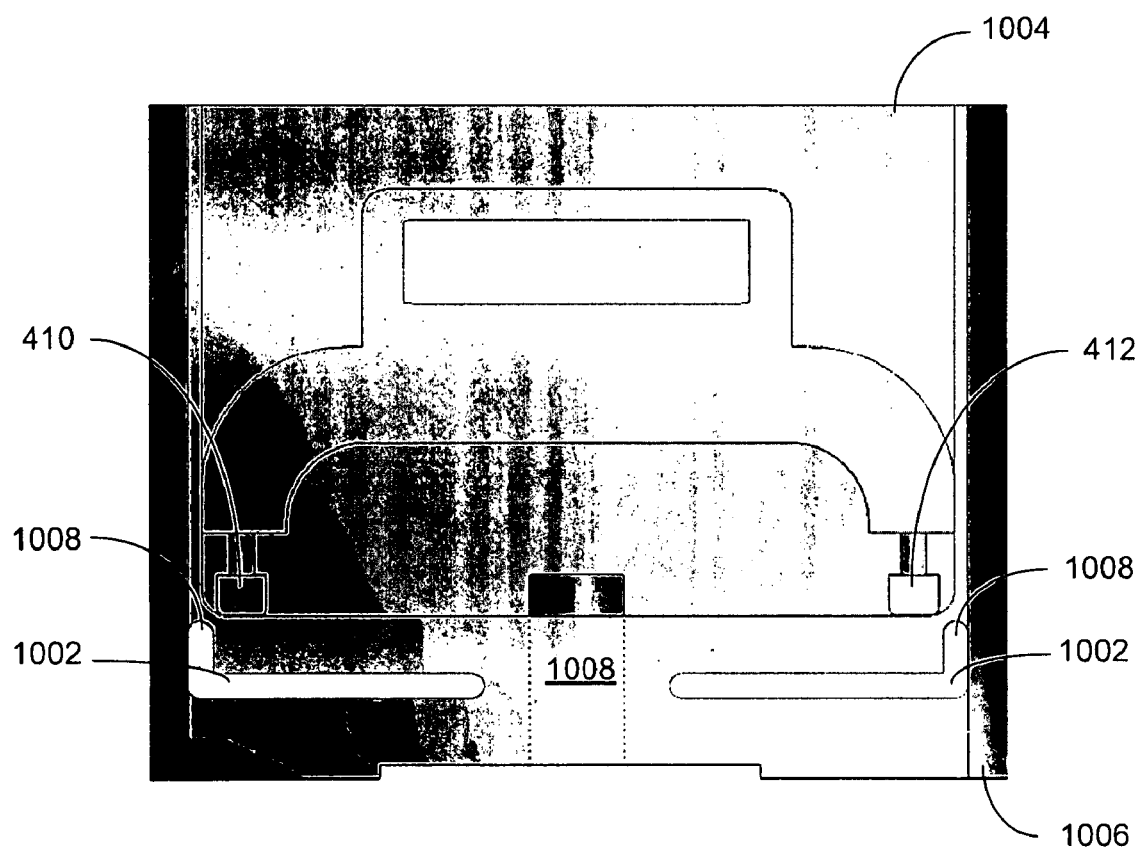
FIG. 10 shows a sensor housing according to another preferred embodiment of the present invention.

FIG. 10 shows another preferred embodiment of a sensor housing 1000 of the present invention. In the embodiment of FIG. 10, the thermal isolation slots 1002 that divide the housing into an upper portion 1004 and a lower portion 1006 do not extend all the way to the edges of the housing. This obviously would allow some heat conduction at the edges of the housing. This conduction can be minimized by lengthening the thermal pathways 1008 at the edges of the housing so that the thermal isolation slots are essentially L-shaped. This embodiment would be expected to be less effective at minimizing the thermal gradient, but might be desirable in some circumstances because of the increased mechanical stability of the housing.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The figures described herein are generally schematic and do not necessarily portray the embodiments of the invention in proper proportion or scale.

We claim as follows:

1. A thermal flow meter comprising:
   a thermal flow sensor to provide a first electrical signal indicative of a flow rate of a fluid flowing between the fluid inlet and the fluid outlet;
   a sensor housing enclosing the thermal flow sensor, the housing having one or more thermal isolation slots extending completely through the housing from front to back, the slots dividing the housing into an upper portion and lower portion by extending laterally partially but not all the way across the housing so that the upper and lower portions of the housing are continuous in the medial portion of the housing; and a sensor housing base, the housing attached to said base at two or more laterally spaced contact points.

2. The thermal flow meter of claim 1 wherein said one or more thermal isolation slots comprises two thermal isolation slots, each slot extending from a lateral edge of the housing toward the other slot so that the slots divide the housing into an upper portion and lower portion, said upper and lower portion being continuous only in the center portion of the housing.

3. The thermal flow meter of claim 2 wherein the length of said thermal isolation slots combined is equal to or greater than one half of the lateral width of the housing.

4. The thermal flow meter of claim 2 wherein said thermal slots extend upward from the edges of the housing at an angle of approximately 10 degrees to 60 degrees relative to the bottom of the housing.

5. The thermal flow meter of claim 2 wherein said thermal slots extend upward from the edges of the housing at an angle of approximately 30 degrees relative to the bottom of the housing.

6. The thermal flow meter of claim 1 wherein a center region of the bottom of the housing is raised so that when the housing is attached to the base, the center region of the bottom of the housing does not make contact with the surface of the base.

7. The thermal flow meter of claim 6 wherein the housing and the base when attached are only in thermal contact at the two lateral ends of the bottom of the housing.

8. The thermal flow meter of claim 1 wherein said thermal flow sensor comprises a thermal mass flow sensor.

9. The thermal flow meter of claim 1 wherein the sensor housing is formed from copper, aluminum, or a zinc-aluminum alloy.

10. The thermal flow meter of claim 1 wherein the sensor housing is formed from a metal casting.

11. The thermal flow meter of claim 1 wherein the housing is formed from a first material and wherein the thermal isolation slots are at least partially filled with a second material having a lower thermal conductivity than the first material.

12. The thermal flow meter of claim 1 wherein the upper and lower portions are only thermally connected through the medial portion of the housing.

13. The thermal flow meter of claim 1 wherein the medial portion of the housing has a width that is less than half of the width of the entire housing.

14. The thermal flow meter of claim 1 wherein the medial portion of the housing has a width that is less than one third of the width of the entire housing.

15. The thermal flow meter of claim 1 wherein the medial portion of the housing has a width that is from 0.15 inches to 0.25 inches.

16. The thermal flow meter of claim 1 wherein the medial portion of the housing has a thickness that is equal to or greater than the full thickness of the remainder of the housing.

17. The thermal flow meter of claim 1 wherein the thermal isolation slots have a height greater than 0.015 inches.

18. The thermal flow meter of claim 1 wherein the thermal isolation slots have a height of 0.015 to 0.030 inches.

19. The thermal flow meter of claim 1 wherein the sensor housing base is formed from stainless steel.

20. The thermal flow meter of claim 1 further comprising one or more additional holes or slots formed through the medial portion of the housing from front to back to form at least two distinct thermal pathways from the lower medial portion to the upper medial portion.

21. A thermal mass flow controller comprising:
the thermal flow meter of claim 1 wherein the thermal flow meter is a thermal mass flow meter for providing an electronic signal indicative of mass flow of a fluid; and
a valve for controlling a fluid flow in accordance with signals from the thermal mass flow meter.

22. A thermal mass flow controller comprising:
a thermal mass flow meter, including:
a mass flow sensor including a capillary tube and wire winding to provide a first electrical signal indicative of a mass flow rate of a fluid flowing through the thermal mass flow meter; and
a sensor housing enclosing the thermal mass flow sensor, the housing divided into an upper portion and a lower portion by one or more thermal isolation slots, the thermal connection between the upper and lower housing portions being divided into a central region having a high thermal conductivity and side regions having thermal conductivity lower than that of the central region;
a sensor housing base supporting the sensor housing; and
a valve for controlling a fluid in accordance with signals from the mass flow meter.

23. The thermal mass flow controller of claim 1 in which the one or more thermal isolation slots extend through the housing from front-to-back.

24. The thermal mass flow controller of claim 1 in which the one or more thermal isolation slots extend from each edge of the housing to the central region.

25. The thermal mass flow controller of claim 1 in which the one or more thermal isolation slots extend from the central region and terminate before the edge of the housing.

26. The thermal mass flow controller of claim 1 in which the one or more thermal isolation slots extend at a non-zero angle relative to the plane of the top surface of the sensor housing base.

27. The thermal mass flow controller of claim 26 in which the one or more thermal isolation slots extend at an angle of between 10 degrees and 60 degrees relative to the plane of the top surface of the sensor housing base.

28. The thermal mass flow controller of claim 27 in which the one or more slots extend from the edge of the housing to the central portion, the housing thickness of the central region being the same as the housing thickness of the upper and lower portions above and below the central region.

29. The thermal mass flow controller of claim 22 wherein the sensor housing has bottom surface with a raised center region so that when the housing is attached to the base, the center region of the bottom surface of the housing does not make contact with the upper surface of the base.

30. The thermal mass flow controller of claim 22 wherein the housing and the base when attached are only in thermal contact at two points.

31. The thermal mass flow controller of claim 23 wherein said two thermal contact points are located at each lateral end of the housing.

32. A thermal flow meter, comprising:
a thermal flow sensor to provide a first signal indicative of a flow rate of a fluid flowing through the thermal flow meter; and a sensor housing enclosing the thermal mass flow sensor, the housing divided into an upper portion and a lower portion by one or more thermal isolation slots, the thermal connection between the upper and lower housing portions being divided into a central region having a high thermal conductivity and side regions having thermal conductivity lower than that of the central region.

33. The thermal flow meter of claim 32 wherein the thermal flow sensor comprises a mass flow sensor including a capillary tube and wire winding to provide a first electrical signal indicative of a mass flow rate of a fluid flowing through the capillary tube.

34. The thermal flow meter of claim 32 wherein the sensor housing has bottom surface with a raised center region so that when the housing is attached to the base, the center region of the bottom surface of the housing does not make contact with the upper surface of the base.

35. The thermal mass flow controller of claim 22 wherein the only the lower portion of the housing is in direct thermal contact with the base.

36. The thermal mass flow controller of claim 23 wherein the lower portion of the housing and the base have two direct thermal contacts, one contact at either lateral end of the lower portion of the housing.

37. A method of measuring flow, comprising passing fluid through a capillary tube, the capillary tube being supported in a sensor housing divided into an upper portion and a lower portion by one or more thermal isolation slots, the thermal connection between the upper and lower housing portions being divided into a central region having a high thermal conductivity and side regions having thermal conductivity lower than that of the central region.

38. A housing for a fluid flow sensor, comprising a thermally conductive block divided into an upper portion and a lower portion by one or more thermal isolation slots, the thermal connection between the upper and lower housing portions being divided into a central region having a high thermal conductivity and side regions having thermal conductivity lower than that of the central region.

* * * * *